Patented Dec. 12, 1944

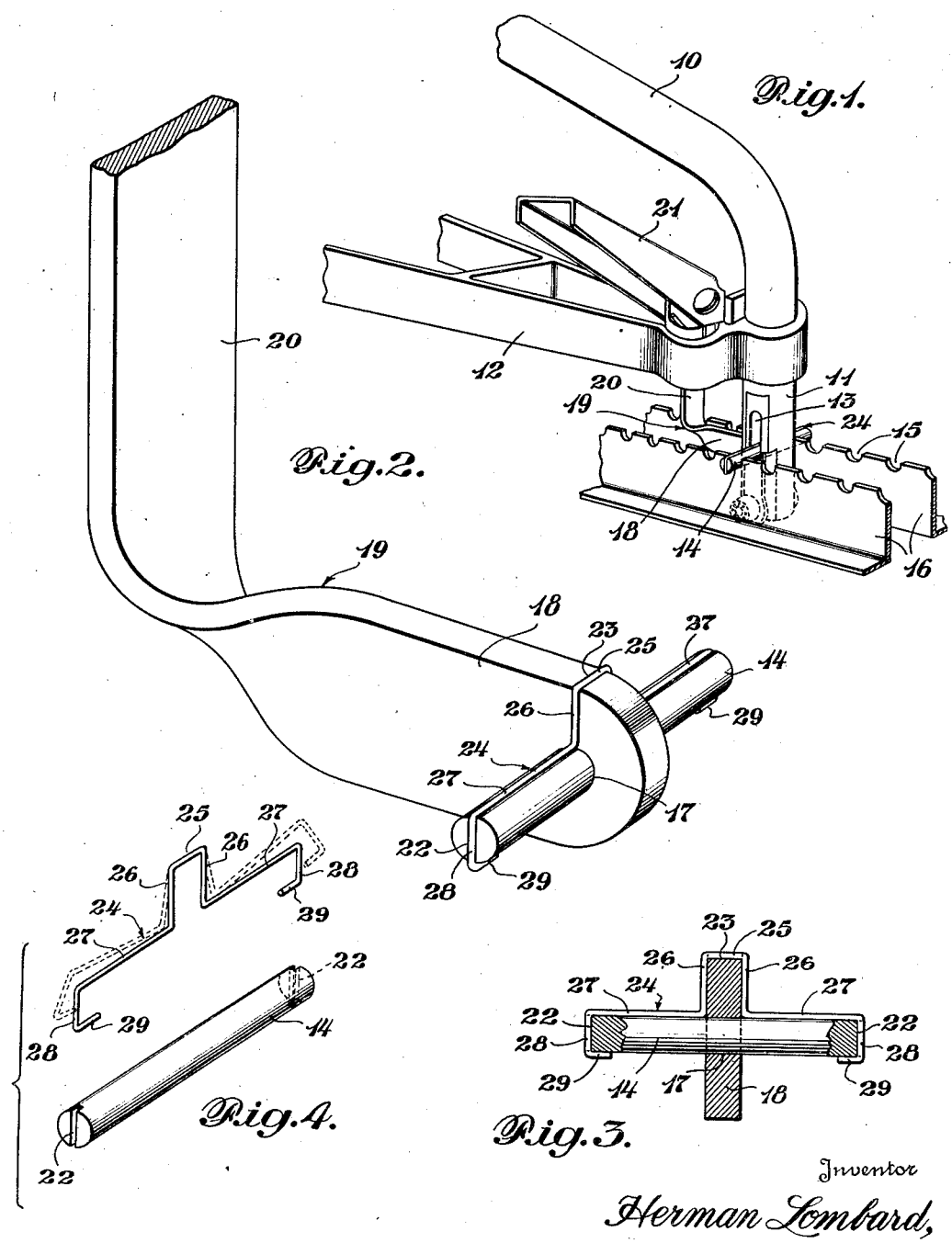

2,364,638

UNITED STATES PATENT OFFICE 2,364,638

RETAINING MEANS FOR LOCKING PINS

Herman Lombard, United States Navy

Application December 1, 1943, Serial No. 512,445

7 Claims. (Cl. 85—5)

(Granted under the act of March 3, 1883, as amended April 30, 1928; 370 O. G. 757)

This invention relates to retaining means for locking pins and the like and it has a particular relation to a removable spring clip for retaining a pin in applied position in an assembly against accidental or unintended displacement.

The principal object of the present invention is the provision of a simple inexpensive and easily applied spring clip for holding a pin in position without weakening the pin by drilling holes therethrough for the reception of cotter pins or otherwise reducing the cross-sectional area of the pin.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawing, means for carrying the invention into practical effect, without limiting the improvements in their useful application to the particular constructions and arrangements which, for the purpose of explanation, have been made the subject of illustration.

In the accompanying drawing:

Fig. 1 is a perspective view of a spring clip constructed in accordance with the present invention illustrated in connection with the locking pin of the pilot's seat of an aircraft;

Fig. 2 is an enlarged fragmentary perspective view of the lock mechanism and spring clip shown in Fig. 1;

Fig. 3 is a transverse sectional view taken on line 3—3 of Fig. 2; and

Fig. 4 is an exploded view of a locking pin and improved spring clip.

Referring to the drawing the invention for the purpose of illustration only, is shown as applied to the supporting structure of the pilot's seat of an aircraft which briefly comprises a leg 10 having a vertically extending portion 11 mounted in a bracket 12. The lower end of the portion 11 of the leg is formed with a transverse slot 13 through which a locking pin 14 extends for selective engagement with a series of notches 15 provided in a pair of parallel fore and aft extending racks 16 fixed to the floor of the aircraft. The pin is forced into a bore 17 formed in a rearwardly extending arm 18 of a link 19 having a vertically extending portion 20 slidably mounted in the bracket 12. The link 19 is raised and lowered in order to disengage and reengage the pin 14 from the notches 15 in the racks 16 so as to adjust the position of the pilot's seat forwardly or rearwardly, by means of a foot pedal 21 which is pivotally mounted on the bracket 12. The above described structure is common in certain types of aircraft and forms no part of the present invention but it has been noted that the locking pin 14, even though it is forced into the bore 17 with a drive fit, frequently works loose in the bore after relatively few adjustments of the pilot's seat.

In order to prevent this danger it is proposed to form the ends of the locking pin 14 with vertical slots 22 and the upper edge of the rearwardly extending arm 18 with a slot 23 disposed in a vertical plane which intersects the axis of the locking pin 14. A spring clip 24 fabricated from music wire or sheet metal is shaped with a central yoke the horizontal span or bight 25 of which is adapted to be seated within the slot 23 and the vertical legs 26 of which extend downwardly in snug engagement with the side surfaces of the arm 18. The horizontal laterally extending portions 27 of the clip extend outwardly in contact with the upper portion of the locking pin 14 to its ends where it is bent downwardly to provide legs 28 adapted to seat within the slots 22 of the locking pin. The extremities of the spring clip are bent inwardly to form arms 29 adapted to engage beneath the locking pin and prevent any vertical displacement of the clip. It will be apparent that the locking pin will be securely held against any axial movement even though it may become loose in the bore 17 in the arm 18 and the clip itself is held against any twisting or rotative movement about the axis of the pin by the horizontal span 25 of the yoke which is seated within the slot 23 in the arm 18.

The clip 24 may be quickly and easily applied to or removed from locking engagement with the pin 14 by springing the vertical legs 28 and the horizontal portions 27 outwardly and upwardly, as indicated by the broken lines in Fig. 4, but otherwise it will securely maintain the locking pin as against accidental displacement.

The invention has been described in connection with the pilot's seat of an aircraft but it will be apparent that it has equal utility in other devices or applications.

It will be understood, as previously stated that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. In combination with a pin extending through a member, resilient retaining means engageable with said member and with the ends of said pin for preventing axial movement of said pin relative to said member, said retaining means having portions extending along the pin from the ends thereof and a yoke portion intermediate said portions adapted to straddle said member and engage the sides thereof to prevent endwise movement of said retaining means and said pin relative to said member, and means for preventing displacement of said retaining means from said pin and member.

2. In combination with a pin extending through a member, a spring clip engageable with said member and with the ends of said pin for preventing axial movement of said pin relative to said member, said spring clip having a yoke portion intermediate its ends adapted to straddle said member and engage the sides thereof, portions extending laterally from said yoke portion along the pin to the ends thereof, and the ends of said spring clip extending beneath the ends of said pin to prevent displacement of said spring clip from said pin and member.

3. In combination with a pin extending through a member, retaining means comprising a clip having a yoke portion clasping said member and a laterally projecting portion on either side of said yoke extending along said pin and engaging with said pin for preventing axial movement of said pin relative to said member.

4. In combination with a pin extending through a member, retaining means comprising a clip having a yoke portion clasping said member and a lateral portion on either side of said member extending along said pin and engaging with said pin adjacent each end portion at points outwardly spaced from said member for preventing axial movement of said pin relative to said member, and means on the ends of said clip for resisting displacement of the clip from said pin and member.

5. In combination with a pin extending through a member, retaining means comprising a clip having a yoke portion clasping said member, and lateral portions connected to said yoke portion extending outwardly in opposite direction along said pin, means on said laterally extending portions for engaging the pin at points outwardly spaced from said member for preventing relative axial movement of the pin and member, and means defined by the extremities of said laterally extending portions for resisting displacement of the clip from said pin and member.

6. In combination, a pin extending through a member, pin retaining means comprising a clip having a yoke portion clasping said member with the bight of said yoke portion received in a recess in said member to prevent movement of the clip relative to said member, lateral portions connected to said yoke portion extending outwardly in opposite directions along the pin, legs on the end portions of said lateral portions engaging the ends of said pin for preventing relative axial movement of the pin and member, and means on the free ends of said legs for resisting displacement of the clip from said pin and member.

7. In combination, a pin extending through a member, pin retaining means comprising a clip having a yoke portion clasping said member with the bight of said yoke portion received in a recess in said member to prevent movement of the clip relative to said member, lateral portions connected to said yoke portion extending outwardly in opposite directions along the pin, legs on the end portions of said lateral portions received in slots in the ends of said pin and engaging the pin for preventing relative rotative or axial movement of the pin and member, and inwardly bent portions on the free ends of said legs for resisting displacement of the clip from said pin and member.

HERMAN LOMBARD.